United States Patent [19]

Nakagawa et al.

[11] Patent Number: 4,521,575

[45] Date of Patent: Jun. 4, 1985

[54] TETRAFLUOROETHYLENE-ETHYLENE TYPE COPOLYMER

[75] Inventors: Shinichi Nakagawa, Nara; Kiyohiko Ihara, Osaka, both of Japan

[73] Assignee: Daikin Kogyo Co., Ltd., Osaka, Japan

[21] Appl. No.: 576,426

[22] Filed: Feb. 2, 1984

[30] Foreign Application Priority Data

Feb. 12, 1983 [JP] Japan .................................. 58-21808
Feb. 12, 1983 [JP] Japan .................................. 58-21809

[51] Int. Cl.³ .................... C08F 210/02; C08F 214/18
[52] U.S. Cl. ....................................... 526/206; 526/227; 526/230.5; 526/231; 526/253; 526/255
[58] Field of Search ............... 526/253, 255, 206, 227, 526/230.5, 231

[56] References Cited

U.S. PATENT DOCUMENTS

| | | | |
|---|---|---|---|
| 2,965,619 | 12/1960 | Honn et al. | 526/255 |
| 3,624,250 | 11/1971 | Carlson | 526/255 |
| 4,123,602 | 10/1978 | Ukihashi et al. | 526/255 |
| 4,133,798 | 1/1979 | Nishimura et al. | 526/255 |
| 4,338,237 | 7/1982 | Sulzbach et al. | 526/255 |

Primary Examiner—Harry Wong, Jr.
Attorney, Agent, or Firm—Birch, Stewart, Kolasch & Birch

[57] ABSTRACT

A copolymer comprising monomeric units of tetrafluoroethylene, ethylene and at least one monomeric compound selected from the group consisting of 2-trifluoromethylpropylene and 2-methyl-1,1,3,3,3-pentafluoropropylene, which has a improved crack resistance at a high temperature.

19 Claims, No Drawings

TETRAFLUOROETHYLENE-ETHYLENE TYPE COPOLYMER

FIELD OF THE INVENTION

The present invention relates to a copolymer comprising tetrafluoroethylene (hereinafter referred to as "TFE"), ethylene and 2-trifluoromethylpropylene or 2-methyl-1,1,3,3,3-pentafluoropropylene as the third monomer.

BACKGROUND OF THE INVENTION

TFE-ethylene copolymer is excellent in chemical resistance, and electrical and mechanical properties. Further, it is moldable by injection or extrusion molding in the same way as usual thermoplastic resins.

However, the TFE-ethylene copolymer tends to be cracked at a high temperature. In order to overcome the defect of the TFE-ethylene copolymer, it is proposed to copolymerize the third monomer as a modifier. For example, Japanese Patent Publication No. 12109/1964 discloses the TFE-ethylene copolymer which contains isobutylene as the modifier to lower the molding temperature so that discoloration of the copolymer at a high temperature is prevented. The publication does not refer to the crack resistance of the copolymer at a high temperature, but in fact, its crack-resistance is not improved.

Japanese Patent Publication No. 23671/1972 discloses copolymerization of a vinyl monomer having a side chain having at least two carbon atoms as the third monomer with TFE and ethylene to improve the mechanical properties of the TFE-ethylene copolymer at a high temperature. Examples of such vinyl monomer are vinyl compounds of the formulas: R—CF=CF$_2$, RO—CF=CF$_2$ and CH$_2$=CX—CH$_2$—R wherein R is a C$_2$–C$_8$ hydrocarbon group, and X is hydrogen or methyl. Among the vinyl compounds, the former two compounds have poor copolymerizability with TFE and/or ethylene and are expensive and hardly obtainable, which makes the copolymer uneconomical. The TFE-ethylene copolymer containing the last vinyl compound as the third monomer has comparatively poor heat resistance.

As a result of the extensive study to improve the drawbacks of the conventional copolymers comprising TFE and ethylene, it has now been found that the copolymerization of 2-trifluoromethylpropylene or 2-methyl-1,1,3,3,3-pentafluoropropylene as the third monomer with TFE and ethylene improve the stress crack resistance of the copolymer at a high temperature, and that the polymerizability of the third monomer is better than the above-described vinyl compounds.

SUMMARY OF THE INVENTION

Accordingly, the present invention provides a copolymer comprising monomeric units of TFE, ethylene and at least one monomeric compound selected from the group consisting of 2-trifluoromethylpropylene and 2-methyl-1,1,3,3,3-pentafluoropropylene.

DETAILED DESCRIPTION OF THE INVENTION

2-Trifluoromethylpropylene is a known compound and may be prepared by the following reaction scheme:

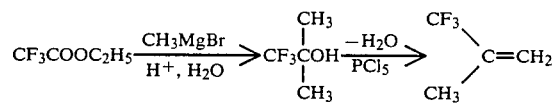

2-Methyl-1,1,3,3,3-pentafluoropropylene is also a known compound and may be prepared by pyrolyzing a compound of the formula:

(cf. Japanese Patent Application No. 129169/1982).

The copolymer according to the invention may be prepared by suspension copolymerization of TFE, ethylene and the third monomer in an aqueous medium containing a solvent in the presence of a radical polymerization initiator. Further, solution or emulsion polymerization may be employed according to the conventional copolymerization of TFE and ethylene.

As the radical initiator to be used in the invention, an organic peroxide, particularly a organic peroxide of the formula:

wherein X is hydrogen, fluorine or chlorine, and n is an integer of 2 to 8 is preferred (cf. Japanese Patent Publication No. 24072/1977). Specific examples of the organic peroxide (I) are di(perfluorpropionyl)peroxide, di(omegahydroperfluorohexanoyl)peroxide, di(omegachloroperfluoropropyonyl)peroxide, etc. A peroxide of the formula:

wherein m is an integer of 1 to 10, for example, di(trichloroperfluorohexanoyl)peroxide is also preferred. Further, it is preferred to use a peroxide decomposable at a low temperature such as diisobutyrylperoxide and diisopropylperoxycarbonate.

As the solvent, chlorofluoroalkane is preferably used. Specific examples of chlorofluoroalkane are trichlorotrifluoroethane, dichlorotetrafluoroethane, chlorotrifluoromethane, dichlorodifluoromethane, chlorodifluoromethane, etc. The amount of the solvent to be added to water is preferably from 10 to 100% by weight. When the copolymer containing a comparatively large amount of 2-methyl-1,1,3,3,3-pentafluoropropylene is prepared, the solvent is not necessarily added to water since 2-methyl-1,1,3,3,3-pentafluoropropylene itself acts as a solvent.

The reaction temperature is preferably from 0° to 80° C. It is preferred to keep the temperature as low as possible in said temperature range so as to prevent the formation of ethylene-ethylene sequence.

The reaction pressure depends on the kind, amount and vapor pressure of the solvent in which the monomers are dissolved. Preferably, it is form 0 to 50 Kg/cm$^2$G, practically from 1 to 15 Kg/cm$^2$G.

The polymerization procedures in the invention may be the same as those in the conventional polymerization of TFE and ethylene.

In order to control the molecular weight of the copolymer, a chain transfer agent may be added to the polymerization system. Specific examples of the chain transfer agent are n-pentane, n-hexane, isopentane, carbon tetrachloride, etc.

Usually the copolymer according to the invention comprises 40 to 60% by mole of units of TFE, 60 to 40% by mole of units of ethylene and 0.1 to 20% by mole of units of the third monomer. When the amount of the third monomer is increased, the high temperature stress crack resistance is more improved. However, in view of the heat resistance, preferred composition of the copolymer is 45 to 55% by mole units of of TFE, 55 to 45% by mole of units of ethylene and 0.1 to 10% by mole of units of the third monomer.

PREFERRED EMBODIMENT OF THE INVENTION

The present invention will be hereinafter explained further in detail by following Examples.

The high temperature crack resistance and the flow rate of the copolymers obtained in Examples are measured as follows:

HIGH TEMPERATURE CRACK RESISTANCE

A sheet (38 mm×13 mm×2 mm) is notched and bent. Then, the sheet is heated from 80° C. at a rate of 2° C./min. and a temperature at which crack appears is recorded.

FLOW RATE

A Koka-type flow tester is used. A copolymer is extruded from an orifice of 2 mm in inner diameter and 8 mm in land length at temperature of 300° C. under piston load of 7 Kg/cm². An amount (ml) extruded in one second is recorded.

EXAMPLE 1

In a 1.5 l glass-made autoclave, deoxygenated water (500 ml) was charged and the interior was thoroughly replaced with nitrogen gas. Then, trichlorotrifluoroethane (500 g) was charged at 40° C. A gaseous mixture of TFE, ethylene and 2-trifluoromethylpropylene in a molar ratio of 80:19:0.5 was injected to pressurize to 4.45 Kg/cm²G. The reaction was initiated by the addition of diisobutyrylperoxide (1.22 g). During the reaction, a gaseous mixture of TFE, ethylene and 2-trifluoromethylpropylene in a molar ratio of 51.6:46.4:2.0 was injected to keep the pressure constant. After continuing the reaction for 170 minutes, unreacted monomers were recovered. The resulting white powder was washed with water and dried to obtain the copolymer (68 g). M.P., 269° C. Flow rate, $1.6 \times 10^{-2}$ ml/sec. High temperature crack resistance, 163° C.

EXAMPLE 2

In the same manner as in Example 1 but charging 1.02 g of diisobutyrylperoxide, the reaction was effected to obtain the copolymer (68 g). M.P., 268° C. Flow rate, $0.33 \times 10^{-2}$ ml/sec. High temperature crack resistance, 183° C.

EXAMPLE 3

In the same manner as in Example 1 but initially charging a gaseous mixture of TFE, ethylene and 2-trifluoromethylpropylene in a molar ratio of 80:19:1, additionally charging a gaseous mixture of TFE, ethylene and 2-trifluoromethylpropylene in a molar ratio of 51:45:4 to keep the reaction pressure 5.45 Kg/cm², the reaction was effected to obtain the copolymer (60 g). M.P., 257° C. Flow rate, $1.4 \times 10^{-2}$ ml/sec. High temperature crack resistance, 185° C.

COMPARATIVE EXAMPLE 1

In the same autoclave as used in Example 1, deoxygenated water (500 ml) was charged and the interior was thoroughly replaced with nitrogen gas. Then, dichlorotetrafluoroethylene (500 g) was charged at 20° C. A gaseous mixture of TFE and ethylene in a molar ratio of 80.3:19.7 was injected to pressurize to 4 Kg/cm²G. The reaction was initiated by the addition of di(omega-hydroperfluorohexanoyl)peroxide (1 g) and n-pentane (14 ml). During the reaction, a gaseous mixture of TFE and ethylene in a molar ratio of 53.5:46.5 was injected to keep the pressure constant. After continuing the reaction for 180 minutes, unreacted monomers were recovered. The resulting white powder was washed with water and dried to obtain the copolymer (64 g). M.P., 287° C. Flow rate, $0.61 \times 10^{-2}$ ml/sec. High temperature crack resistance, 135° C.

COMPARATIVE EXAMPLE 2

In the same manner as in Comparative Example 1 but initially charging a gaseous mixture of TFE, ethylene and isobutylene in a molar ratio of 80.6:17.5:1.9 in place of the mixture of TFE and ethylene, additionally charging a gaseous mixture of TFE, ethylene and isobutylene in a molar ratio of 53.3:43.3:3.4 to keep the reaction pressure 6.8 Kg/cm², the reaction was effected for 290 minutes to obtain the white copolymer (95 g). M.P., 259° C. Flow rate, $0.9 \times 10^{-2}$ ml/sec. High temperature crack resistance, 140° C.

EXAMPLE 4

In a 1.5 l glass-made autoclave, deoxygenated water (400 ml) was charged and the interior was thoroughly replaced with nitrogen gas. Then, trichlorotrifluoroethane (700 g) was charged at 20° C. 2-methyl-1,1,3,3,3-pentafluoropropylene (160 g) was charged and then a gaseous mixture of TFE and ethylene in a molar ratio of 82:18 was injected to pressurize to 6.4 Kg/cm²G. The reaction was initiated by the addition of di(omega-hydroperfluorohexanoyl)peroxide (0.45 g). During the reaction, a gaseous mixture of TFE and ethylene in a molar ratio of 52:48 was injected to keep the pressure constant. After continuing the reaction for 6 hours, unreacted monomers were recovered. The resulting white particles were washed with water and dried to obtain the copolymer (52 g). M.P., 268° C. Flow rate, $0.24 \times 10^{-2}$ ml/sec. High temperature crack resistance, 184° C.

EXAMPLE 5

In the same manner as in Example 4 but charging 200 g of 2-methyl-1,1,3,3,3-pentafluoropropylene, the reaction was effected to obtain the white copolymer (45 g). M.P., 265° C. Flow rate, $1.2 \times 10^{-2}$ ml/sec. High temperature crack resistance, 160° C.

COMPARATIVE EXAMPLE 3

In the same manner as in Example 4 but using no 2-methyl-1,1,3,3,3-pentafluoropropylene, charging n-pentane (35 ml) as the chain transfer agent, the reaction was effected for 2 hours to obtain the white copolymer (60 g). M.P., 289° C. Flow rate, $0.9 \times 10^{-2}$ ml/sec. High temperature crack resistance, 130° C.

What is claimed is:

1. A copolymer comprising 40 to 60% by mole of monomeric units of tetrafluoroethylene, 60 to 40% by mole of monomeric units of ethylene and 0.1 to 20% by mole of monomeric units of at least one monomeric compound selected from the group consisting of 2-trifluoromethylpropylene and 2-methyl-1,1,3,3,3-pentafluoropropylene.

2. A copolymer according to claim 1, wherein the monomeric compound is 2-trifluoromethylpropylene.

3. A copolymer according to claim 1, wherein the monomeric compound is 2-methyl-1,1,3,3,3-pentafluoropropylene.

4. A copolymer according to claim 1, which comprises 45 to 55% by mole of units of tetrafluoroethylene, 55 to 45% by mole of units of ethylene and 0.1 to 10% by mole of units of the monomeric compound.

5. A process for preparing a copolymer comprising 40 to 60% by mole of monomeric units of tetrafluoroethylene, 60 to 40% by mole of monomeric units of ethylene, and 0.1 to 20% by mole of monomeric units of at least one monomeric compound selected from the group consisting of 2-trifluoromethylpropylene and 2-methyl-1,1,3,3,3-pentafluoropropylene, which process comprises copolymerizing tetrafluoroethylene, ethylene and the monomeric compound in the presence of a radical polymerization initiator to form said copolymer.

6. A process according to claim 5, wherein the radical initiator is an organic peroxide.

7. A process according to claim 6, wherein the organic peroxide is a compound of the formula:

$(XC_nF_{2n}COO-)_2$ wherein X is hydrogen, fluorine or chlorine, and n is an integer of 2 to 8.

8. A process according to claim 7, wherein the organic peroxide is one selected from the group consisting di(perfluorpropionyl)peroxide, di(omega-hydroperfluorohexanoyl)peroxide and di(omega-chloroperfluoropropyonyl)peroxide.

9. A process according to claim 6, wherein the organic peroxide is a compound of the formula:

$[Cl(CF_2CFCl)_mCF_2COO-]_2$ wherein m is an integer of 1 to 10.

10. A process according to claim 9, wherein the organic peroxide is of di(trichloroperfluorohexanoyl)peroxide.

11. A process according to claim 6, wherein the organic peroxide is one selected from the group consisting of diisobutyrylperoxide and diisopropylperoxycarbonate.

12. A process according to claim 5, wherein copolymerization is conducted at a reaction temperature of from 0° to 80° C.

13. A process according to claim 5, wherein the copolymer is prepared by suspension copolymerization in an aqueous medium containing a chlorofluoroalkane solvent.

14. A process according to claim 5, wherein the copolymer is prepared by solution or emulsion polymerization.

15. A process according to claim 13, wherein the solvent is selected from the group consisting of trichlorotrifluoroethane, dichlorotetrafluoroethane, chlorotrifluoromethane, dichlorodifluoromethane, and chlorodifluoromethane.

16. A process according to claim 13, wherein the amount of solvent to be added to water is from 10 to 100% by weight.

17. A process according to claim 5, wherein a chain transfer agent is added to the reaction system.

18. A process according to claim 17, wherein the chain transfer agent is selected from the group consisting of n-pentane, n-hexane, isopentane and carbon tetrachloride.

19. A process according to claim 5, wherein copolymerization is conducted at a reaction pressure of from 0 to 50 kg/cm²G.

* * * * *